(12) United States Patent
Takahashi et al.

(10) Patent No.: US 10,583,430 B2
(45) Date of Patent: Mar. 10, 2020

(54) ION EXCHANGE MEMBRANE AND PRODUCTION PROCESS THEREFOR

(71) Applicant: ASTOM CORPORATION, Tokyo (JP)

(72) Inventors: Tomoaki Takahashi, Moriyama (JP); Hiroshi Miyazawa, Moriyama (JP); Nobuyuki Tanaka, Shunan (JP); Nobuhiko Ohmura, Shunan (JP); Kazuo Mizuguchi, Shunan (JP); Kenji Fukuta, Shunan (JP)

(73) Assignee: ASTOM CORPORATION, Tokyo (JP)

( * ) Notice: Subject to any disclaimer, the term of this patent is extended or adjusted under 35 U.S.C. 154(b) by 117 days.

(21) Appl. No.: 15/328,673

(22) PCT Filed: Jul. 16, 2015

(86) PCT No.: PCT/JP2015/070446
§ 371 (c)(1),
(2) Date: Jan. 24, 2017

(87) PCT Pub. No.: WO2016/013489
PCT Pub. Date: Jan. 28, 2016

(65) Prior Publication Data
US 2017/0216832 A1    Aug. 3, 2017

(30) Foreign Application Priority Data

Jul. 24, 2014  (JP) .................. 2014-150413

(51) Int. Cl.
*B01D 67/00* (2006.01)
*B01D 69/02* (2006.01)
(Continued)

(52) U.S. Cl.
CPC .......... *B01J 39/20* (2013.01); *B01D 67/0027* (2013.01); *B01D 67/0088* (2013.01);
(Continued)

(58) Field of Classification Search
None
See application file for complete search history.

(56) References Cited

U.S. PATENT DOCUMENTS

| 4,437,952 A | 3/1984 | Smith et al. |
| 5,256,503 A | 10/1993 | Cook et al. |

(Continued)

FOREIGN PATENT DOCUMENTS

| CN | 1578806 A | 2/2005 |
| CN | 1744246 A | 3/2006 |

(Continued)

OTHER PUBLICATIONS

JP2012021099 Machine Translation—Espacenet translation of specification of JP 2012-021099 (Year: 2012).*

(Continued)

*Primary Examiner* — Bradley R Spies
(74) *Attorney, Agent, or Firm* — Birch, Stewart, Kolasch & Birch, LLP

(57) ABSTRACT

An ion exchange membrane having a structure that an ion exchange resin is filled in spaces of a porous base film, the porous base film has a structure that at least two porous olefin resin layers are laminated with a bonding strength of 100 gf/cm or more to less than 700 gf/cm and a Gurley air permeance of 500 sec/100 ml or less in terms of a 100 μm thick film. In this ion exchange membrane, base film has high air permeability though it has a multi-layer structure that a plurality of porous resin films are bonded together, and therefore a rise in electric resistance caused by the lamination of the base sheets is effectively suppressed.

5 Claims, 1 Drawing Sheet

(51) Int. Cl.
    *B01D 71/26* (2006.01)
    *B01J 47/12* (2017.01)
    *B32B 27/08* (2006.01)
    *B32B 27/32* (2006.01)
    *B32B 38/00* (2006.01)
    *B32B 5/22* (2006.01)
    *C08J 5/22* (2006.01)
    *B01D 69/12* (2006.01)
    *B01J 39/05* (2017.01)
    *B01J 39/20* (2006.01)
    *B01J 41/05* (2017.01)
    *B01J 41/07* (2017.01)
    *B01J 41/14* (2006.01)
    *B32B 3/26* (2006.01)

(52) U.S. Cl.
    CPC .......... *B01D 69/02* (2013.01); *B01D 69/125* (2013.01); *B01D 71/26* (2013.01); *B01J 39/05* (2017.01); *B01J 41/05* (2017.01); *B01J 41/07* (2017.01); *B01J 41/14* (2013.01); *B01J 47/12* (2013.01); *B32B 3/26* (2013.01); *B32B 5/22* (2013.01); *B32B 27/08* (2013.01); *B32B 27/32* (2013.01); *B32B 38/0012* (2013.01); *B32B 38/0032* (2013.01); *C08J 5/22* (2013.01); *C08J 5/2243* (2013.01); *B01D 2323/46* (2013.01); *B01D 2325/42* (2013.01); *B32B 2038/0028* (2013.01); *B32B 2260/046* (2013.01); *B32B 2323/00* (2013.01); *C08J 2323/06* (2013.01); *C08J 2325/12* (2013.01)

(56) References Cited

U.S. PATENT DOCUMENTS

| | | |
|---|---|---|
| 2004/0258881 A1 | 12/2004 | Takata et al. |
| 2005/0019665 A1 | 1/2005 | Adachi et al. |
| 2006/0046136 A1 | 3/2006 | Park et al. |
| 2006/0241192 A1 | 10/2006 | Kitamura et al. |
| 2009/0269641 A1 | 10/2009 | Harada |
| 2011/0287342 A1 | 11/2011 | Harada |
| 2013/0299060 A1 | 11/2013 | Chen et al. |

FOREIGN PATENT DOCUMENTS

| | | |
|---|---|---|
| CN | 101733013 A | 6/2010 |
| CN | 102978654 A | 3/2013 |
| EP | 1464669 A1 | 10/2004 |
| JP | 63-503074 A | 11/1988 |
| JP | 64-22932 A | 1/1989 |
| JP | 2007-14958 A | 1/2007 |
| JP | 2008-4500 A | 1/2008 |
| JP | 2009-91461 A | 4/2009 |
| JP | 2009-96923 A | 5/2009 |
| JP | 2012-21099 A | 2/2012 |
| JP | 5436357 B2 | 3/2014 |

OTHER PUBLICATIONS

Extended European Search Report for corresponding Application No. 15825005.0, dated Feb. 14, 2018.
International Search Report for PCT/JP2015/070446 (PCT/ISA/210) dated Oct. 6, 2015.
Written Opinion of the International Searching Authority for PCT/JP2015/070446 (PCT/ISA/237) dated Oct. 6, 2015.
Chinese Office Action dated Jul. 3, 2018, issued in corresponding Chinese Patent Application No. 201580037891.0.
Chinese Office Action and Search Report, dated Jan. 29, 2019, for corresponding Chinese Application No. 201580037891.0, with an English translation of the Chinese Office Action.

\* cited by examiner

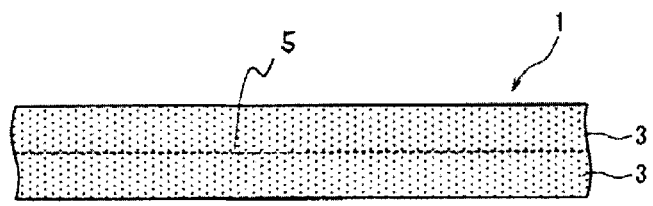

ION EXCHANGE MEMBRANE AND PRODUCTION PROCESS THEREFOR

TECHNICAL FIELD

The present invention relates to an ion exchange membrane comprising a porous olefin resin film having a large number of pores penetrating therethrough as a base material and an ion exchange resin filled in the pores of the film and to a production process therefor.

BACKGROUND ART

An ion exchange membrane is used in many industrial fields, for example, as an electrodialytic membrane for use in a desalination step in salt production and food fields and an electrolyte film for fuel cells and as a membrane for diffusion dialysis used for acid collection from an acid containing a metal ion produced in the iron and steel industry. This ion exchange membrane has a structure that a base film serving as a reinforcing material is installed as a core material in an ion exchange resin, thereby providing certain film strength and film shape stability. If the core material is not existent, as the ion exchange resin has a large number of ion exchange groups, it readily swells when it is immersed in an electrolyte aqueous solution with the result of a reduction in strength and a form change.

It has been known that a porous thermoplastic resin film is used as the above base film, and this film is actually used. In an ion exchange membrane having this porous film as a base material, an ion exchange resin is filled in the pores of the porous film as the base material with the result that the electric resistance of the film (to be referred to as "membrane resistance" hereinafter) is advantageously low. For example, Patent Document 1 discloses a cation exchange membrane for salt production, comprising a porous stretched polyethylene film (Hipore of Asahi kasei E-Materials Corp. or SETELA of Tonen Chemical Nasu Corporation) as a base film.

By the way, since the ion exchange membrane is used for various purposes and different in implementation scale, it is various in size, and its strength, dimensional stability and shape stability must be improved according to the size.

Therefore, the thickness of the porous base film in the ion exchange membrane must be large. Since this porous film has a large number of pores, as compared with a film having no pores, it has low strength and no rigidity. Therefore, it must be made thick to improve its strength, dimensional stability and shape stability.

However, most commercially available porous films have a limited thickness of about several tens of μm. The production of porous films having a suitable thickness according to each purpose and size becomes small-quantity production, thereby losing an industrial advantage.

Then, commercially available porous films having a limited thickness are laminated, and this laminated film is used as a base film to produce an ion exchange membrane. In this case, means for laminating porous films becomes a problem.

For example, Patent Document 2 discloses anion exchange membrane which includes a porous film obtained by laminating two porous resin sheets and bonding them together by thermal fusion at a temperature higher than the melting point. Since the porous resin sheets are bonded together by thermal fusion at a temperature higher than the melting point, pores formed in the porous film are occluded. That is, this base film has low air permeability (high Gurley air permeance), and an ion exchange membrane formed by using this has high electric resistance. Therefore, in Patent Document 2, a fibrous resin sheet (specifically, a fibril-like sheet) is used as the porous resin sheet to be laminated so as to increase its porosity (void ratio), thereby suppressing a reduction in air permeability (a rise in Gurley air permeance) and a rise in the electric resistance of the ion exchange membrane derived from the occlusion of pores caused by thermal fusion.

Then, when a fibrous base film is used, porosity becomes too high with the result that the deterioration of mechanical strength cannot be avoided, thereby causing a problem that the thickness of the base film must be made larger than necessary. Therefore, an ordinary olefin resin base film cannot be used in this means and therefore, a polytetrafluoroethylene base film is used in Patent Document 2, resulting in extremely high cost.

In Patent Document 3, the present applicant proposes a process for producing an ion exchange membrane by filling a monomer composition for forming an ion exchange resin in spaces in a plurality of porous resin sheets (laminated sheet) which are laminated but not bonded together and polymerizing the monomer composition in this state to produce an ion exchange resin.

In this process, since the porous resin sheets are bonded together not directly but by means of the ion exchange resin filled in spaces (pores), a problem such as the occlusion of pores caused by the bonding of the porous resin sheets can be completely avoided, a rise in the electric resistance of the ion exchange membrane can be prevented without fail, and further, an expensive special resin such as polytetrafluoroethylene does not need to be used as the material of the porous resin sheet, resulting in a great economical advantage. However, in this process, since the porous resin sheets are not bonded together, interface delamination between the porous resin sheets readily occurs. Therefore, further improvement is needed.

PRIOR ART DOCUMENT

Patent Documents

Patent Document 1: JP-A 2009-96923
Patent Document 2: JP-A 2008-4500
Patent Document 3: JP-A 2012-21099

DISCLOSURE OF THE INVENTION

Problem to be Solved by the Invention

It is therefore an object of the present invention to provide an ion exchange membrane which has high air permeability (low Gurley air permeance) though its base film is composed of porous resin films bonded together and therefore suppresses a rise in electric resistance caused by the lamination of base sheets effectively and to a production process therefor.

Means for Solving the Problem

According to the present invention, there is provided an ion exchange membrane in which an ion exchange resin is filled in the spaces of a porous base film, wherein the porous base film has a structure that at least two porous olefin resin layers are laminated with a bonding strength of 100 gf/cm or more to less than 700 gf/cm and a Gurley air permeance of 500 sec/100 ml or less in terms of a 100 thick film.

In the present invention, the Gurley air permeance is an index represented by the number of seconds during which a certain volume of air passes through a base material (film) having a certain area at a certain pressure difference and also called "air resistance". That is, as this value becomes smaller, air permeability becomes higher (air permeability becomes higher).

According to the present invention, there is further provided a process for producing an ion exchange membrane, comprising the steps of:

preparing at least two porous olefin resin films;

laminating the porous olefin resin films and stretching and molding the resulting laminate at a temperature lower than the melting point of the olefin-based resin to produce a porous base film having a multi-layer structure;

immersing the porous base film in a polymerizable composition for forming an ion exchange resin to produce anion exchange membrane precursor comprising the polymerizable composition filled in the spaces of the film; and polymerizing the polymerizable composition in the ion exchange membrane precursor.

In the production process of the present invention, preferably, (1) the above stretching and molding are carried out at a temperature T which satisfies the following temperature condition:

$Tm-20°C. \leq \text{temperature } T < Tm$ wherein Tm is the melting point of the above olefin resin; and (2) all of the porous olefin resin films have a porosity of 20 to 60%; and further, there may be adopted the following means: (3) the polymerizable composition for forming an ion exchange resin comprises a monomer having an ion exchange group, and the ion exchange resin is formed by the above polymerization; or (4) the polymerizable composition for forming an ion exchange resin comprises a monomer having a functional group capable of introducing an ion exchange group, and the ion exchange group is introduced after the above polymerization.

Effect of the Invention

The ion exchange membrane of the present invention includes a base film having a multi-layer structure that at least two porous olefin resin films are laminated, the base film has a high bonding strength of the porous olefin resin film layers opposed to each other of 100 gf/cm or more and an extremely low Gurley air permeance (may be simply referred to as "G-permeance" hereinafter) of 500 sec/100 ml or less in terms of a 100 μm thick film though it has a multi-layer structure with such high bonding strength. That is, such a low G-permeance means not that this multi-layer structure is formed by bonding together the porous olefin resin films by thermal fusion but that the occlusion of pores in the film is effectively avoided.

Therefore, the ion exchange membrane of the present invention has improved strength due to the multi-layer structure of the base film with high bonding strength and effectively suppresses a rise in electric resistance caused by lamination as the occlusion of pores in the base film caused by lamination is effectively avoided.

In the present invention, the above multi-layer structure of the base film, that is, a multi-layer structure having high bonding strength though it has low G-permeance is obtained by stretching and molding a laminate of porous olefin resin films. This stretching and molding step includes stretching and molding operations and a heat treatment which is carried out after them and is carried out at a temperature lower than the melting point of the olefin resin, for example, a temperature T which satisfies the following temperature condition:

$Tm-20°C. \leq \text{temperature } T < Tm$ wherein Tm is the melting point of the above olefin resin.

That is, the long-chain molecules of the olefin resin are intertwined by the stretching operation at the interface between opposed porous olefin resin films with the result that the porous olefin resin films are laminated with the above high bonding strength. The multi-layer film obtained as described above has improved burst strength as compared with a single-layer porous film having the same thickness. In addition, as the stretching operation is not carried out at a temperature higher than the melting point, unlike bonding by thermal fusion, the occlusion of pores in the porous olefin resin layers is effectively avoided, thereby making it possible to secure low G-permeance.

In the present invention, the biggest advantage is that a high-strength base film can be obtained by using unstretched porous olefin films having a limited thickness which are easily produced and acquired, laminating them by the stretching operation in the above-described method and setting the number of the films to be laminated to a suitable value so as to increase the total thickness. That is, it is possible to produce a thick single-layer porous film equivalent to the base film used in the present invention by a known process. However, it is rarely realistic to produce a porous film having such a large thickness according to target strength each time. That is, since the use application of this porous film is strictly limited, industrial-scale mass-production is impossible and small-quantity production is unprofitable.

Since a porous multi-layer film having high bonding strength and a large thickness can be produced without increasing its G-permeance by using porous olefin resin films having a limited thickness which are easily produced and acquired and laminating them in the present invention, an ion exchange membrane can be manufactured by using this porous multi-layer film as a base film. That is, since even a base film having limited use application and not suitable for mass-production can be easily produced by using films having a thickness which can be easily produced and acquired, the present invention is very useful industrially.

BRIEF DESCRIPTION OF THE DRAWING

FIG. 1 is a schematic sectional view of a porous base film used for the production of the ion exchange membrane of the present invention.

BEST MODE FOR CARRYING OUT THE INVENTION

<Porous Base Film>

With reference to FIG. 1, the porous base film (represented by 1 as a whole) used in the present invention has a multi-layer structure that two porous olefin resin layers 3, 3 are laminated. The interface between the layers is represented by 5.

FIG. 1 shows a two-layer structure but the number of layers is not limited to 2 and may be 3 or more if the layers are formed from an olefin resin and can be stretched while they are laminated. That is, the number of layers can be set to a suitable value according to strength or thickness required for the porous base film 1.

A large number of pores (reference numeral is omitted) penetrating from the front side to the rear side are formed in the porous olefin resin layer 3. For example, what is used as the base film for an ion exchange membrane has an average pore diameter (front or rear surface is observed) of preferably 0.01 to 2.0 μm, particularly preferably 0.015 to 0.4 μm so as to obtain appropriate exchange membrane characteristics.

In the present invention, the volume ratio of pores having the above size, that is, the porosity is preferably 20 to 65%, particularly preferably 30 to 60%. That is, when this porosity is excessively high, for example, when this resin layer 3 is formed from a fiber material such as a nonwoven sheet, the strength of the layer 3 becomes very low, whereby the effect of improving strength by lamination may be lost, or dimensional stability may be impaired. When this porosity is too low and an ion exchange membrane is manufactured by using this base film 1, high electric resistance may be obtained and ion exchange membrane characteristics may be impaired.

Further, the thickness of the porous olefin resin layer 3 (single-layer thickness) is about 20 to 150 μm.

Typical examples of the olefin resin forming the porous olefin resin layer 3 include homopolymers or copolymers of an α-olefin such as ethylene, propylene, 1-butene, 1-pentene, 1-hexene, 3-methyl-1-butene, 4-methyl-1-pentene and 5-methyl-1-heptene, and chlorine-containing olefin resins such as polyvinyl chloride, vinyl chloride-vinyl acetate copolymer, vinyl chloride-vinylidene chloride copolymer and vinyl chloride-olefin copolymers. They may be used alone or in combination of two or more.

Although examples of the olefin resin include fluorine-based resins such as polytetrafluoroethylene, the fluorine-containing resins have the difficulty of forming pores in a nonfibrous form and the difficulty of bonding by stretching which will be described hereinafter (it seems that molecules are hardly expanded and contracted). Therefore, non-fluorine-based olefin resins containing no fluorine enumerated above, particularly high-, medium- or low-density polyethylene is preferred, and high-density polyethylene having an intrinsic viscosity [η] of more than 1.5 dl/g is most preferred.

Further, out of the above high-density polyethylenes, there is one which is difficult to be melt kneaded and to be molded into a film (for example, a super high-density polyethylene). In this case, the polyethylene is used in combination with a resin which can be melt kneaded so as to be used in a form able to be molded into a film.

The above-described porous olefin resin layers 3, 3 need to be stretched. Although stretching may be either monoaxial or biaxial, these porous olefin resin layers are stretched to preferably at least 1.2 times or more, particularly preferably 1.4 times or more in a MD direction and to preferably at least 1.2 times or more, particularly preferably 1.5 times or more in a TD direction. The total draw ratio is preferably 10 times or less. When the draw ratio is low, bonding strength which will be described hereinafter becomes low.

The MD direction is the winding direction of the porous olefin resin film to be stretched and the same as the lengthwise direction of this film or the discharge direction of the raw material olefin resin at the time of forming a film. The TD direction is a direction perpendicular to the MD direction and corresponds to the width direction of the film.

The porous base film 1 which has a multi-layer structure consisting of the above-described porous olefin resin layers 3, 3 and is stretched is manufactured, for example, by using a resin composition comprising an olefin resin described above for molding a film and additives (such as paraffin and inorganic powders) for forming pores, extrusion molding the resin composition into a film having a predetermined thickness, removing the additives mixed with the film by extraction with an organic solvent or dissolution with an acid or alkali and laminating and stretching a predetermined number of the obtained unstretched porous olefin resin films (two in FIG. 1).

Preferably, the stretching operation is carried out monoaxially or biaxially with a roll or tenter at a predetermined draw ratio while a predetermined number of unstretched porous olefin resin films are laminated, and then a heat treatment such as heat setting or thermal relaxation is carried out to improve heat shrinkage resistance. The stretching and molding step in the present invention includes not only the above stretching operation but also a heat treatment for improving heat shrinkage resistance which is carried out as a post-step.

Stretching and heat treatment (heat setting or thermal relaxation) are carried out at a temperature lower than the melting point of an olefin resin forming the porous olefin resin film as a matter of course, for example, a temperature T which satisfies the following temperature condition:

$$Tm-20°\ C. \leq \text{temperature } T < Tm, \text{ preferably } Tm-15°\ C. \leq \text{temperature } T \leq Tm-1°\ C.$$

(Tm is the melting point of the above olefin resin). Thereby, satisfactory bonding strength can be obtained. When a mixture of two or more olefin resins is used as the above olefin resin, the stretching and molding temperature should be lower than the melting point of an olefin resin whose content is the highest.

As for the melting point of the olefin resin forming the porous olefin resin film, if the melting point of the constituent resin is known, it is used but if it is not known, the film melting point of the porous olefin resin film is measured by a differential scanning calorimeter to obtain the melting point of the above olefin resin as the maximum temperature in a melting heat absorption curve. When a plurality of peaks are existent in the melting curve, a peak temperature having the largest peak area is adopted as the melting point of an olefin resin whose content is the highest. Although the reason that satisfactory bonding strength is obtained by selecting the temperature is not known, it is assumed as follows.

That is, in stretching and molding which are carried out by laminating the porous olefin resin films without heating them at a temperature higher than the melting point, olefin resin molecules enter the inside of the interface at the interface 5 between the porous olefin resin films and are stretched in this state and intertwined with one another. This intertwining is fixed by cooling after that so that the porous olefin resin films are bonded together with high bonding strength, thereby forming the porous base film 1 having a multi-layer structure consisting of the above-described porous olefin resin layers 3, 3.

The film thickness of the porous base film 1 is not particularly limited but generally 40 to 250 μm. To obtain a thick ion exchange membrane freely, the film thickness is preferably 80 to 250 μm.

In the porous base film 1 formed as described above, the bonding strength of the porous olefin resin layers 3, 3 is extremely high, i.e., 100 gf/cm or more to less than 700 gf/cm, more specifically 150 to 550 gf/cm.

Although the unit gf/cm is used in this text, when the SI unit system is used, the bonding strength is calculated based on gf/cm=0.0098 N/cm.

The ion exchange membrane of the present invention exhibits high burst strength as the bonding strength of the porous olefin resin layers 3, 3 is high. However, surprisingly, although the ion exchange membrane has such high bonding strength (burst strength), a rise in the electric resistance of the film is effectively avoided. That is, high bonding strength, high burst strength and low membrane resistance are obtained at the same time. The reason for this is not known but it is assumed as follows.

A plurality of porous olefin resin films are laminated and stretched without being pressed in a direction perpendicular to the film surface, thereby making it possible to keep the low G-permeance of the porous olefin resin film. That is, in the base film 1 formed by laminating the porous olefin resin films (porous olefin resin layers 3) by stretching, the occlusion of the pores of the porous olefin resin films at the time of lamination is effectively prevented, whereby the G-permeance is reduced to, for example, 500 sec/100 ml or less, specifically 100 to 300 sec/100 ml in terms of a 100 μm thick film. This low G-permeance reduces film resistance.

The intertwining of molecules at the bonding interface between films (interface between the porous olefin-based resin layers 3, 3) occurs at the time of stretching, thereby reducing the pore diameter at the bonding interface as compared with the surface of the laminated film (base film 1) and improving burst strength per unit thickness. In fact, as a result of these, the porous base film 1 in the present invention exhibits high bonding strength as compared with a porous multi-layer film obtained by pressing in a direction perpendicular to the film surface. As a result, the ion exchange membrane obtained by using this base film 1 has low film resistance and high burst strength as described above.

<Ion Exchange Membrane>

The ion exchange membrane of the present invention has a structure that the ion exchange resin is filled in the spaces (not occluded pores) of the porous base film 1 formed as described above, high strength is obtained by the multi-layer structure of the porous base film 1, and further the deterioration of film characteristics derived from a rise in electric resistance caused by lamination is effectively avoided.

Ion Exchange Resin;

The ion exchange resin to be filled in the pores of the porous base film 1 may be a known ion exchange resin such as a resin obtained by introducing an ion exchange group for developing ion exchangeability, more specifically, a cation exchange group or an anion exchange group into a hydrocarbon-based or fluorine-based resin.

Examples of the above hydrocarbon-based resin include styrene-based resins and acrylic resins, and examples of the fluorine-based resin include perfluorocarbon-based resins.

The ion exchange group is a functional group which may become negative or positive charge in an aqueous solution. Examples of the cation exchange group include sulfonate group, carboxylate group and phosphonate group, out of which sulfonate group which is a strong acid group is preferred. Examples of the anion exchange group include primary to tertiary amino groups, quaternary ammonium group, pyridyl group, imidazole group and quaternary pyridinium group, out of which quaternary ammonium group and quaternary pyridinium group which are strong basic groups are preferred.

The ion exchange resin having the above ion exchange group is existent in the ion exchange membrane in an amount that ensures an appropriate ion exchange capacity (for example, 0.1 to 4.0 meq/g) according to the porosity of the above-described porous base film 1 and the amount of the ion exchange group introduced into the ion exchange resin.

<Production of Ion Exchange Membrane>

In the present invention, the ion exchange membrane having the above-described porous base film 1 is produced by preparing a polymerizable composition for forming an ion exchange resin (preparation of a polymerizable composition), immersing the porous base film 1 in this polymerizable composition to fill the polymerizable composition in the pores of the film 1 (filling of the polymerizable composition), then polymerizing the polymerizable composition filled in the pores and further introducing an ion exchange group into the polymer (ion exchange resin precursor) obtained in the polymerization step as required (ion exchange group introducing step).

1. Preparation of Polymerizable Composition;

The polymerizable composition for forming an ion exchange group comprises a monomer having a functional group (functional group for introducing an exchange group) capable of introducing the above-described ion exchange group or a monomer having the ion exchange group (these monomers may be referred to as "basic monomer component" hereinafter), a crosslinkable monomer and a polymerization initiator and is prepared by mixing these components together.

Monomers having a functional group for introducing an exchange group and monomers having an ion exchange group which have been used to produce an ion exchange resin are acceptable.

Examples of the monomer having a functional group for introducing a cation exchange group include styrene, vinyl toluene, vinyl xylene, α-methyl styrene, vinyl naphthalene and α-halogenated styrenes.

Examples of the monomer having a functional group for introducing an anion exchange group include styrene, bromobutyl styrene, vinyl toluene, chloromethyl styrene, vinyl pyridine, vinyl imidazole, α-methyl styrene and vinyl naphthalene.

Examples of the monomer having a cation exchange group include sulfonic acid-based monomers such as α-halogenated vinyl sulfonic acid, styrene sulfonic acid and vinyl sulfonic acid, carboxylic acid-based monomers such as methacrylic acid, acrylic acid and maleic anhydride, phosphonic acid-based monomers such as vinyl phosphoric acid, and salts and esters thereof.

Examples of the monomer having an anion exchange group include amine-based monomers such as vinylbenzyl trimethylamine, [4-(4-vinylphenyl)-methyl]-trimethylamine and vinylbenzyl triethylamine, nitrogen-containing heterocyclic monomers such as vinyl pyridine and vinyl imidazole, and salts and esters thereof.

When a monomer having an ion exchange group is used as the above monomer, an ion exchange membrane of interest is obtained at the time of the completion of the polymerization step which will be described hereinafter. When a monomer having a functional group for introducing an ion exchange group is used, an ion exchange membrane of interest can be obtained by carrying out the ion exchange group introducing step after the polymerization step.

The crosslinkable monomer is used to densify the ion exchange resin and enhance swelling suppression properties and film strength and is not particularly limited. Examples of the crosslinkable monomer include divinyl compounds such as divinyl benzene, divinyl sulfone, butadiene, chloroprene, divinyl biphenyl, trivinyl benzenes, divinyl naphthalene, diallyl amine and divinyl pyridine.

The crosslinkable monomer is used in an amount of preferably 0.1 to 50 parts by weight, more preferably 1 to 40 parts by weight based on 100 parts by weight of the above-described basic monomer component.

Further, another monomer copolymerizable with the monomer having a functional group for introducing an exchange group, the monomer having an ion exchange group and the crosslinkable monomer may be added as required besides these monomers. Examples of the monomer include styrene, acrylonitrile, methyl styrene, acrolein, methyl vinyl ketone and vinyl biphenyl.

A conventionally known polymerization initiator is used as the polymerization initiator without restriction. Examples of the polymerization initiator include organic peroxides such as octanoyl peroxide, lauroyl peroxide, t-butylperoxy-2-ethyl hexanoate, benzoyl peroxide, t-butylperoxy isobutyrate, t-butylperoxy laurate, t-hexylperoxy benzoate and di-t-butyl peroxide.

This polymerization initiator is used in an amount of preferably 0.1 to 20 parts by weight, more preferably 0.5 to 10 parts by weight based on 100 parts by weight of the basic monomer component.

The polymerizable composition comprising the above components may be blended with a matrix resin as required to adjust viscosity.

As the matrix resin may be used an ethylene-propylene copolymer, saturated aliphatic hydrocarbon-based polymer such as polybutyrene, styrene-based polymer such as styrene-butadiene copolymer, polyvinyl chloride or copolymer obtained by copolymerizing a comonomer with these.

Examples of the above comonomer include styrene-based monomers such as vinyl toluene, vinyl xylene, chlorostyrene, chloromethyl styrene, α-methyl styrene, α-halogenated styrene and α,β,β'-trihalogenated styrene, monoolefins such as ethylene and butylene, and conjugated diolefins such as butadiene and isoprene.

These matrix resins are used in an amount that ensures viscosity at which the polymerizable composition can be filled and held in the pores of the porous base film 1 quickly without dripping.

2. Filling of Polymerizable Composition;

The pores of the porous base film 1 are filled by immersing the film 1 in a tank filled with the above-described polymerizable composition. An ion exchange membrane precursor in which the polymerizable composition is filled in the pores of the porous base film 1 is obtained by this immersion.

As a matter of course, the pores can be filled with the polymerizable composition by spray coating.

3. Polymerization;

The ion exchange membrane precursor in which the polymeizable composition is filled in the pores of the porous base film 1 is heated in a polymerization apparatus such as a heating oven to be polymerized.

When a monomer having an ion exchange group is used as the basic monomer component, an ion exchange membrane of interest is obtained by the completion of this step. When a monomer having a functional group for introducing an exchange group is used as the basic component, an ion exchange group must be introduced after the completion of this step.

In this polymerization step, in general, a method in which the ion exchange membrane precursor filled with the polymerization composition is sandwiched between polyester films and heated from normal temperature under increased pressure is employed. A pressure of 0.1 to 1.0 MPa is generally applied with an inert gas such as nitrogen or a roll. Polymerization is carried out while a surplus of the polymerizable composition existent at the interface on the outer side of the film 1 is pressed into the pores of the film by this pressure, thereby making it possible to effectively prevent the production of a resin pool.

The polymerization conditions are influenced by the type of the polymerization initiator and the type of the monomer and may be determined by suitably selecting from known conditions.

The polymerization temperature should be lower than the melting point of the olefin resin forming the porous base film 1. In general, in the case of a polyethylene film, the polymerization temperature is 40 to 130° C.

The polymerization time which differs according to the polymerization temperature is generally 3 to 20 hours.

4. Introduction of Ion Exchange Group;

As described previously, when a monomer having an ion exchange group is used as the basic monomer component in the polymerizable composition, an ion exchange resin is formed by the above polymerization step and an ion exchange membrane of interest is obtained in this stage. However, when a monomer having a functional group for introducing an exchange group is used as the basic monomer component, an ion exchange group must be introduced after the polymerization step as a resin obtained by the above polymerization step has no ion exchange group.

The introduction of an ion exchange group is carried out by a method known per se. For example, to manufacture a cation exchange membrane, the introduction of an ion exchange group is carried out by sulfonation, chlorosulfonation, phosphonation or hydrolysis and to manufacture an anion exchange membrane, the introduction of an ion exchange group is carried out by amination or alkylation.

The ion exchange membrane of the present invention obtained as described above has high burst strength if the film resistance is the same. In general, the ion exchange membrane has a film resistance of 50 to 300 $\Omega \cdot cm^2/cm$ and a burst strength of 30 to 70 MPa/cm in terms of a 1 cm thick film.

The ion exchange membrane formed as described above is cut to a suitable size and then used or marketed.

The ion exchange membrane has high strength according to the number of layers of the porous base film 1, the occlusion of the pores of the film 1 is effectively avoided, the base film 1 exhibits high air permeability (low G-permeance), as the ion exchange resin filled in the pores has a portion effectively continuous from the front surface to the rear surface of the base film, the electric resistance is low, a rise in electric resistance caused by lamination is suppressed, and ion exchange characteristics are satisfactory.

EXAMPLES

The following experimental examples are provided to further illustrate the present invention.

The characteristic properties of the porous base film and the ion exchange membrane were measured by the following methods.

1. Film Thickness of Porous Base Film

This was measured at an atmospheric temperature of 23±2° C. by using the micro-thickness meter of Toyo Seiki Seisaku-sho, Ltd. (Type KBN (trademark), terminal diameter of 5 mm, measurement pressure of 62.47 kPa).

2. Film Melting Point of Porous Base Film

This was measured by using the DSC-220C of Seiko Instruments Inc. The porous base film was punched into a circular form having a diameter of 5 mm, and several circular pieces having a total weight of 3 mg were laminated and used as a measurement sample. This laminate was placed on an aluminum open sample pan having a diameter of 5 mm, a clamping cover was placed on the sample, and the sample was fixed on the aluminum pan with a sample sealer. The film melting point of the sample was measured in a nitrogen atmosphere by elevating the temperature from 30° C. to 180° C. at an elevation rate of 10° C./min to take a temperature at which a melting heat absorption curve was peaked as film melting point. When a plurality of peaks were existent in the melting curve, the temperature of a peak having the largest peak area was taken as film melting point.

3. Bonding Strength of Porous Base Film

A sample having a width of 15 mm and a length of 150 mm at 25° C. and 65% RH and prepared by ripping off part of the bonding surface was set in a tensile tester (Autograph AGS-X of Shimadzu Corporation) in a T-like shape at a chuck interval of 75 mm to measure bonding force at a rate of 500 mm/min. Bonding strength was obtained from the measured bonding force based on the following equation.

Bonding strength (gf/cm)=bonding force (gf)/sample width (cm)

4. G-Permeance of Porous Base Film (Air Resistance)

This was measured by using a Gurley permeability tester in accordance with JIS P-8117.

This measurement value was converted to a value in terms of a 100 μm thick film as G-permeance.

$G$-permeance (sec/100 ml)=measured permeance (sec/100 ml)×100 (μm)/film thickness (μm)

5. Porosity of Porous Base Film

A rectangular sample having a width of X cm and a length of Y cm was cut out from the porous base film to calculate the porosity from the following equation (1).

Porosity (%)={1−(10,000×$M$/ρ/($X$×$Y$×$T$)}×100 (1)

wherein
T: sample thickness (μm)
M: sample weight (g)
ρ: density of resin (g/cm$^3$)

6. Average Pore Diameter of Porous Base Film

This was measured by a half-dry method in accordance with ASTM-F316-86.

7. Intrinsic Viscosity [η]

[η] was measured at a temperature of 135° C. by using decalin as a solvent in accordance with ASTM-D4020.

8. Ion Exchange Capacity and Water Content of Ion Exchange Membrane

The ion exchange membrane was immersed in a 1 mol/l-HCl aqueous solution for 10 hours or more. Thereafter, in the case of a cation exchange membrane, the counter ion of the ion exchange group was substituted by a sodium ion from a hydrogen ion with a 1 mol/l-NaCl aqueous solution, and the quantity of the detached hydrogen ion was determined with a potential difference titrator (COMTITE-900 of Hiranuma Sangyo Co., Ltd.) by using a sodium hydroxide aqueous solution (A mol).

In the case of an anion exchange membrane, the counter ion was substituted by a nitrate ion from a chloride ion with a 1 mol/l-NaNO$_3$ aqueous solution, and the quantity of the detached chloride ion was determined with a potential difference titrator (COMTITE-900 of Hiranuma Sangyo Co., Ltd.) by using a silver nitrate aqueous solution (A mol).

Then, the same ion exchange membrane was immersed in a 1 mol/l-NaCl aqueous solution for 4 hours or more and fully rinsed with ion exchange water. Thereafter, water on the surface of the membrane was wiped off with tissue paper to measure the mass (W g) of the membrane when it was wet. Further, the weight (D g) of the membrane after it was vacuum dried at 60° C. for 5 hours was measured. The ion exchange capacity and water content of the ion exchange membrane were obtained based on the above measurement values from the following equation.

Ion exchange capacity=$A$×1000/$D$[meq/g-dry mass]

Water content=100×($W$−$D$)/$D$[%]

9. Thickness of Ion Exchange Membrane

After the ion exchange membrane was immersed in a 0.5 mol/L-NaCl aqueous solution for 4 hours or more, water on the surface of the membrane was wiped off with tissue paper, and the thickness of the membrane was measured with the MED-25PJ micro-meter (Mitutoyo Corporation).

10. Burst Strength Per Unit Thickness of Ion Exchange Membrane

The ion exchange membrane was immersed in a 0.5 mol/L-NaCl aqueous solution for 4 hours or more and fully rinsed with ion exchange water. Then, the burst strength of the membrane was measured by using a Muellen-type hydraulic burst strength machine (manufactured by Toyo Seiki Seisaku-sho, Ltd.) in accordance with JIS-P8112 without drying the membrane. The burst strength per unit thickness was calculated from the obtained measurement value and the thickness of the ion exchange membrane based on the following equation.

Burst strength per unit thickness (MPa/cm)=measured burst strength (MPa)/film thickness (cm)

11. Membrane Resistance Per Unit Thickness of Ion Exchange Membrane

The ion exchange membrane was sandwiched between two chamber cells having a platinum black electrode, and a 0.5 mol/L-NaCl aqueous solution was filled on both sides of the ion exchange membrane to measure resistance between the electrodes at 25° C. with an AC bridge (frequency of 1,000 cycles/sec) so as to obtain membrane resistance from a difference between the above electrode resistance and electrode resistance when the ion exchange membrane was not installed. The ion exchange membrane used for the above measurement had been equilibrated in a 0.5 mol/L-NaCl aqueous solution in advance.

The membrane resistance per unit thickness was calculated from the obtained membrane resistance and the thickness of the ion exchange membrane based on the following equation.

Membrane resistance per unit thickness (Ω·cm$^2$/cm) =membrane resistance (Ω·cm$^2$)/film thickness (cm)

Production Example 1

The following components were mixed together according to the following formulation and melt kneaded together by means of a double-screw extruder having a T die at the end.

Super-high molecular weight polyethylene: 19.2 parts by weight
  Intrinsic viscosity [η]; 7.0 dl/g
High-density polyethylene: 12.8 parts by weight
  Intrinsic viscosity [η]; 2.8 dl/g
Dioctyl phthalate (DOP): 48 parts by weight
Fine powder silica: 20 parts by weight The molten kneaded product obtained above was extruded from the end of the extruder, and the extruded sheet was rolled with a heated roll from both sides to obtain a sheet-like molded product having a thickness of 195 μm.

DOP and fine powder silica were extracted and removed from the obtained sheet-like molded product to produce a porous film.

Two of the porous films were laminated and stretched to 1.4 times in an MD direction at 120° C. and then to 1.9 times in a TD direction at 120° C. and heat set at 131° C. at the end to obtain a multi-layer porous base film. The physical properties of the obtained multi-layer porous base film are shown in Table 1.

Production Example 2

A sheet-like molded product was obtained in the same manner as in Production Example 1 except that the thickness of the molded product was changed from 195 μm to 170 μm.

DOP and fine powder silica were extracted and removed from the obtained sheet-like molded product having a thickness of 170 μm to produce a porous film.

Two of the porous films were laminated and stretched to 1.4 times in an MD direction at 120° C. and then to 1.9 times in a TD direction at 120° C. and heat set at 129° C. at the end to obtain a multi-layer porous base film. The physical properties of the obtained multi-layer porous base film are shown in Table 1.

Production Example 3

A sheet-like molded product having a thickness of 190 μm was obtained in the same manner as in Production Example 1, and further, a single-layer porous base film was obtained in the same manner as in Production Example 1. The physical properties of the obtained porous base film are shown in Table 1.

Production Example 4

A sheet-like molded product was obtained in the same manner as in Production Example 1 except that the thickness of the sheet was changed from 195 μm to 210 μm.

DOP and fine powder silica were extracted and removed from this sheet-like molded product having a thickness of 210 μm to produce a porous film.

This porous film was directly stretched to 1.9 times in a TD direction at 120° C. and heat set at 132° C. at the end to obtain a single-layer porous base film. The physical properties of the obtained porous base film are shown in Table 1.

Production Example 5

Two of the single-layer porous base films produced in Production Example 4 were laminated and thermally pressed at 120° C. and a pressure of 8.2 kg/cm² for 5 minutes. The physical properties of the obtained multi-layer porous base film are shown in Table 1.

Production Example 6

Two of the single-layer porous base films produced in Production Example 4 were laminated and thermally pressed at 135° C. and a pressure of 8.2 kg/cm² for 5 minutes. The physical properties of the obtained multi-layer porous base film are shown in Table 1.

Production Example 7

A multi-layer porous base film was obtained in the same manner as in Production Example 1 except that the stretching temperature was changed to 137° C. and the final heat setting temperature was changed to 140° C.

When the peel strength of the obtained multi-layer porous base film was measured, the film was broken without separation between layers. The physical properties of the obtained film are shown in Table 1.

Production Example 8

A sheet-like molded product was obtained in the same manner as in Production Example 1 except that the thickness was changed from 195 μm to 90 μm.

DOP and fine powder silica were extracted and removed from this sheet-like molded product having a thickness of 90 μm to produce a porous film.

Two of the porous films were laminated and stretched to 1.1 times in an MD direction at 120° C. and then to 1.1 times in a TD direction at 120° C. and heat set at 130° C. at the end to obtain a multi-layer porous base film. The physical properties of the obtained multi-layer porous base film are shown in Table 1.

Production Example 9

A sheet-like molded product was obtained in the same manner as in Production Example 1 except that the thickness was changed from 195 μm to 290 μm.

DOP and fine powder silica were extracted and removed from this sheet-like molded product having a thickness of 290 μm to produce a porous film.

Two of the porous films were laminated and stretched to 2 times in an MD direction at 120° C. and then to 2 times in a TD direction at 120° C. and heat set at 132° C. at the end to obtain a multi-layer porous base film. The physical properties of the obtained multi-layer porous base film are shown in Table 1.

Production Example 10

A sheet-like molded product was obtained in the same manner as in Production Example 1 except that the thickness was changed from 195 μm to 460 μm.

DOP and fine powder silica were extracted and removed from this sheet-like molded product having a thickness of 460 μm to produce a porous film.

Two of the porous films were laminated and stretched to 2.5 times in an MD direction at 120° C. and then to 2.5 times in a TD direction at 120° C. and heat set at 133° C. at the end to obtain a multi-layer porous base film. The physical properties of the obtained multi-layer porous base film are shown in Table 1.

Production Example 11

A sheet-like molded product was obtained in the same manner as in Production Example 1 except that the thickness was changed from 195 μm to 660 μm.

DOP and fine powder silica were extracted and removed from this sheet-like molded product having a thickness of 660 μm to produce a porous film.

Two of the porous films were laminated and stretched to 3 times in an MD direction at 120° C. and then to 3 times in a TD direction at 120° C. and heat set at 134° C. at the end to obtain a multi-layer porous base film. The physical properties of the obtained multi-layer porous base film are shown in Table 1.

Production Example 12

A sheet-like molded product was obtained in the same manner as in Production Example 1 except that the thickness was changed from 195 µm to 850 µm.

DOP and fine powder silica were extracted and removed from this sheet-like molded product having a thickness of 850 µm to produce a porous film.

Two of the porous films were laminated and stretched to 3.4 times in an MD direction at 120° C. and then to 3.4 times in a TD direction at 120° C. and heat set at 136° C. at the end to obtain a multi-layer porous base film. The physical properties of the obtained multi-layer porous base film are shown in Table 1.

TABLE 1

| Production Example | Constitution | Film thickness [µm] | Film melting point [° C.] | Porosity [%] | Average pore diameter [µm] | Bonding strength [gf/cm] | G-permeance [sec/100 ml@100 µm] |
|---|---|---|---|---|---|---|---|
| 1 | Two layers | 130 | 135 | 50 | 0.13 | 200 | 230 |
| 2 | Two layers | 140 | 135 | 60 | 0.15 | 190 | 118 |
| 3 | Single layer | 190 | 135 | 53 | * | — | 789 |
| 4 | Single layer | 100 | 135 | 46 | 0.12 | — | 290 |
| 5 | Two layers (thermal press) | 200 | 135 | 44 | 0.11 | 10 | 667 |
| 6 | Two layers (thermal press) | 190 | 135 | 20 | * | 700 | 15000 or more |
| 7 | Two layers | 75 | 135 | 10 | * | 1500 | 15000 or more |
| 8 | Two layers | 130 | 135 | 50 | 0.10 | 80 | 550 |
| 9 | Two layers | 132 | 135 | 51 | 0.14 | 300 | 200 |
| 10 | Two layers | 125 | 135 | 48 | 0.13 | 460 | 250 |
| 11 | Two layers | 127 | 135 | 49 | 0.11 | 670 | 400 |
| 12 | Two layers | 112 | 135 | 42 | * | 860 | 5000 |

*: Unmeasurable

Example 1

A polymerizable composition was prepared by mixing together the following components according to the following formulation.
73.5 parts by mass of styrene
16.5 parts by mass of p-chloromethyl styrene
10.0 parts by mass of acrylonitrile
2.5 parts by mass of tributyl acetyl citrate
2.9 parts by mass of styrene oxide
1.9 parts by mass of Kayabutyl D (di-t-butyl peroxide of Kayaku Akzo Corporation)

The composition of this polymerizable composition is shown in Table 2.

500 g of this polymerizable composition was put into a 1,000 ml glass container, and the porous base film produced in Production Example 1 was immersed as a base sheet in this polymerizable composition to fill the polymerizable composition in the spaces of the film.

The porous base film filled with the above polymerizable composition was taken out, covered with a polyester film having a thickness of 100 µm as a separating material on both sides and thermally polymerized under a nitrogen pressure of 0.4 MPa at 120° C. for 6.8 hours.

The obtained film-like product was immersed in a mixture of 98% concentrated sulfuric acid and chlorosulfonic acid having a purity of 90% or more in a weight ratio of 1:1 at 40° C. for 60 minutes. Thereafter, the film-like product was immersed in 90% sulfuric acid, 60% sulfuric acid and ion exchange water sequentially and further in a 4 mol/L-NaOH aqueous solution for 12 hours and rinsed to obtain a sulfonic acid type cation exchange membrane. The evaluation results of the characteristic properties of the obtained cation exchange membrane are shown in Table 3.

Examples 2 and 3

The cation exchange membranes of the present invention were manufactured in the same manner as in Example 1 except that base sheets and polymerizable compositions shown in Table 2 were used. The evaluation results of the characteristic properties of the obtained cation exchange membranes are shown in Table 3.

Example 4

A polymerizable composition was prepared by mixing together the following components according to the following formulation.
86.0 parts by mass of p-chloromethyl styrene
14.0 parts by mass of divinyl benzene (purity of 57%)
4.0 parts by mass of styrene oxide
4.0 parts by mass of Kayabutyl D (di-t-butyl peroxide of Kayaku Akzo Corporation)

The composition of this polymerizable composition is shown in Table 2.

500 g of this polymerizable composition was put into a 1,000 ml glass container, and the porous base film produced in Production Example 1 was immersed as a base sheet in this polymerizable composition to fill the polymerizable composition in the spaces of the sheet.

The porous base film filled with the above polymerizable composition was taken out, covered with a polyester film having a thickness of 100 µm as a separating material on both sides and thermally polymerized under a nitrogen pressure of 0.4 MPa at 80° C. for 5 hours and then at 90° C. for 2 hours.

The obtained film-like product was immersed in a mixture of 15 parts by weight of a 30% trimethylamine aqueous solution, 52.5 parts by weight of water and 22.5 parts by weight of acetone at 30° C. for 16 hours to obtain a quaternary ammonium type anion exchange membrane. The evaluation results of the characteristic properties of the obtained anion exchange membrane are shown in Table 3.

Examples 5, 6 and 7

The cation exchange membranes of the present invention were manufactured in the same manner as in Example 1 except that base sheets and polymerizable compositions shown in Table 2 were used. The evaluation results of the characteristic properties of the obtained anion exchange membranes are shown in Table 3.

Comparative Example 1

A cation exchange membrane was manufactured in the same manner as in Example 2 except that the single-layer porous base film produced in Production Example 3 was used in place of the multi-layer porous base film of Production Example 1. The composition of the polymerizable composition used to manufacture this cation exchange membrane is shown in Table 2, and the evaluation results of the characteristic properties of the obtained cation exchange membrane are shown in Table 3.

Comparative Example 2

An anion exchange membrane was manufactured in the same manner as in Example 4 except that the single-layer porous base film of Production Example 3 was used in place of the multi-layer porous base film of Production Example 1. The composition of the polymerizable composition used to manufacture this anion exchange membrane is shown in Table 2, and the evaluation results of the characteristic properties of the obtained anion exchange membrane are shown in Table 3.

Comparative Example 3

A cation exchange membrane was manufactured in the same manner as in Example 2 except that the single-layer porous base film of Production Example 4 was used in place of the multi-layer porous base film of Production Example 1. The composition of the polymerizable composition used to manufacture this cation exchange membrane is shown in Table 2, and the evaluation results of the characteristic properties of the obtained cation exchange membrane are shown in Table 3.

Comparative Example 4

A cation exchange membrane was manufactured in the same manner as in Example 2 except that the multi-layer porous base film produced in Production Example 5 was used in place of the multi-layer porous base film of Production Example 1. A desired cation exchange membrane could not be obtained as laminated porous base films were separated from each other when sulfonation was carried out with a mixture of concentrated sulfuric acid and chlorosulfonic acid.

Comparative Example 5

A cation exchange membrane was manufactured in the same manner as in Example 2 except that the multi-layer porous base film produced in Production Example 6 was used in place of the multi-layer porous base film of Production Example 1. The composition of the polymerizable composition used to manufacture this cation exchange membrane is shown in Table 2, and the evaluation results of the characteristic properties of the obtained cation exchange membrane are shown in Table 3.

Comparative Example 6

A cation exchange membrane was manufactured in the same manner as in Example 2 except that a base sheet prepared by laminating two of the single-layer porous base films produced in Production Example 4 was used in place of the multi-layer porous base film of Production Example 1. A desired cation exchange membrane could not be obtained as laminated porous base films were separated from each other when sulfonation was carried out with a mixture of concentrated sulfuric acid and chlorosulfonic acid.

Comparative Example 7

A cation exchange membrane was manufactured in the same manner as in Example 2 except that the multi-layer porous base film of Production Example 7 was used in place of the multi-layer porous base film of Production Example 1. The composition of the polymerizable composition used to manufacture this cation exchange membrane is shown in Table 2, and the evaluation results of the characteristic properties of the obtained cation exchange membrane are shown in Table 3.

Comparative Example 8

A cation exchange membrane was manufactured in the same manner as in Example 2 except that the multi-layer porous base film of Production Example 8 was used in place of the multi-layer porous base film of Production Example 1. A desired cation exchange membrane could not be obtained as laminated porous base films were separated from each other when sulfonation was carried out with a mixture of concentrated sulfuric acid and chlorosulfonic acid.

Comparative Example 9

A cation exchange membrane was manufactured in the same manner as in Example 2 except that the multi-layer porous base film of Production Example 12 was used in place of the multi-layer porous base film of Production Example 1. The composition of the polymerizable composition used to manufacture this cation exchange membrane is shown in Table 2, and the evaluation results of the characteristic properties of the obtained cation exchange membrane are shown in Table 3.

TABLE 2

| Example | Base sheet | Polymerizable composition (parts by mass) | | | | | | |
|---|---|---|---|---|---|---|---|---|
| | | St | p-CMS | AN | DVB | ATBC | StO | KD |
| 1 | Production Ex. 1 | 73.5 | 16.5 | 10.0 | — | 2.5 | 2.9 | 1.9 |
| 2 | Production Ex. 1 | 66.3 | 23.7 | 10.0 | — | 2.5 | 2.9 | 1.9 |
| 3 | Production Ex. 2 | 66.3 | 23.7 | 10.0 | — | 2.5 | 2.9 | 1.9 |
| 4 | Production Ex. 1 | — | 86.0 | — | 14.0 | | 4.0 | 4.0 |
| 5 | Production Ex. 9 | 66.3 | 23.7 | 10.0 | — | 2.5 | 2.9 | 2.9 |
| 6 | Production Ex. 10 | 66.3 | 23.7 | 10.0 | — | 2.5 | 2.9 | 2.9 |
| 7 | Production Ex. 11 | 66.3 | 23.7 | 10.0 | — | 2.5 | 2.9 | 2.9 |
| Comp. Ex. 1 | Production Ex. 3 | 66.3 | 23.7 | 10.0 | — | 2.5 | 2.9 | 2.9 |
| Comp. Ex. 2 | Production Ex. 3 | — | 86.0 | — | 14.0 | | 4.0 | 4.0 |
| Comp. Ex. 3 | Production Ex. 4 | 66.3 | 23.7 | 10.0 | — | 2.5 | 2.9 | 1.9 |
| Comp. Ex. 4 | Production Ex. 5 | 66.3 | 23.7 | 10.0 | — | 2.5 | 2.9 | 1.9 |
| Comp. Ex. 5 | Production Ex. 6 | 66.3 | 23.7 | 10.0 | — | 2.5 | 2.9 | 1.9 |
| Comp. Ex. 6 | 2 sheets of Production Ex. 4 | 66.3 | 23.7 | 10.0 | — | 2.5 | 2.9 | 1.9 |
| Comp. Ex. 7 | Production Ex. 7 | 66.3 | 23.7 | 10.0 | — | 2.5 | 2.9 | 1.9 |
| Comp. Ex. 8 | Production Ex. 8 | 66.3 | 23.7 | 10.0 | — | 2.5 | 2.9 | 1.9 |
| Comp. Ex. 9 | Production Ex. 12 | 66.3 | 23.7 | 10.0 | — | 2.5 | 2.9 | 1.9 |

St: styrene,
p-CMS: p-chloromethyl styrene,
AN: acrylonitrile,
DVB: divinyl benzene,
ATBC: tributyl acetyl citrate,
Sto: styrene oxide,
KD: Kayabutyl D (di-t-butyl peroxide)

TABLE 3

Characteristic properties of ion exchange membrane

| Example | Membrane thickness [μm] | Ion exchange capacity [meq/g-dry mass] | Water content [%] | Membrane resistance [Ω·cm$^2$/cm] | Burst strength [Mpa/cm] |
|---|---|---|---|---|---|
| 1 | 150 | 2.7 | 43 | 113 | 39 |
| 2 | 130 | 2.5 | 38 | 238 | 42 |
| 3 | 146 | 2.7 | 41 | 171 | 35 |
| 4 | 150 | 2.2 | 31 | 153 | 35 |
| 5 | 133 | 2.5 | 38 | 215 | 44 |
| 6 | 128 | 2.4 | 36 | 245 | 46 |
| 7 | 129 | 2.5 | 37 | 300 | 50 |
| Comp. Ex. 1 | 198 | 2.6 | 44 | 212 | 21 |
| Comp. Ex. 2 | 209 | 2.3 | 32 | 191 | 22 |
| Comp. Ex. 3 | 112 | 2.6 | 40 | 164 | 27 |
| Comp. Ex. 4 | Separated during sulfonation | | | | |
| Comp. Ex. 5 | 203 | 0.4 | 8 | 2000 or more | 37 |
| Comp. Ex. 6 | Separated during sulfonation | | | | |
| Comp. Ex. 7 | 80 | 0.3 | 5 | 2000 or more | 40 |
| Comp. Ex. 8 | Separated during sulfonation | | | | |
| Comp. Ex. 9 | 113 | 2.0 | 28 | 1000 | 54 |

EXPLANATION OF REFERENCE NUMERALS

1: porous base film
3: porous olefin resin layer

The invention claimed is:

1. A porous base film used as a base material of an ion exchange membrane, wherein said porous base film has a laminated structure in which at least two porous olefin resin layers stretched in the same direction are laminated one upon the other with a bonding strength of not less than 100 gf/cm but less than 700 gf/cm, and has a Gurley air permeance of not more than 500 sec/100 ml calculated as a thickness of 100 μm.

2. The porous base film according to claim 1, wherein pores of the porous base film have an average pore size of 0.015 to 0.4 μm as observed in the surface thereof.

3. The porous base film according to claim 2, wherein the porous base film has a voidage of 20 to 60%.

4. The porous base film according to claim 2, wherein said porous olefin resin layers have a bonding strength of not less than 190 gf/cm.

5. An ion exchange membrane obtained by filling the gaps in the porous base film of claim 1 with an ion exchange resin.

\* \* \* \* \*